April 25, 1961 H. SIXSMITH 2,981,082
HEAT EXCHANGERS
Filed Aug. 25, 1958
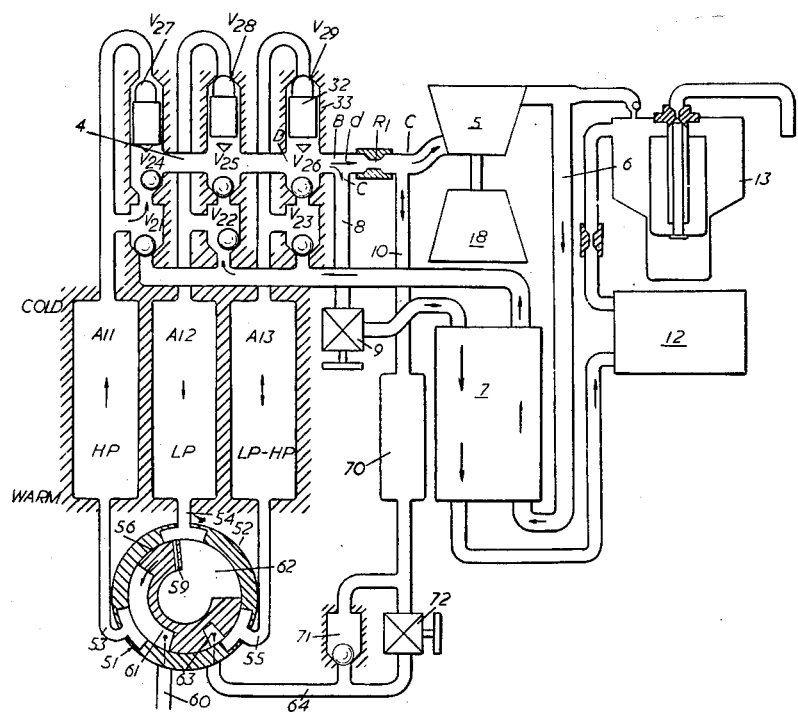
Inventor
Herbert Sixsmith
By
Stevens, Davis, Miller & Mosher
Attorneys

United States Patent Office 2,981,082
Patented Apr. 25, 1961

2,981,082

HEAT EXCHANGERS

Herbert Sixsmith, Reading, England, assignor to National Research Development Corporation, London, England, a corporation of Great Britain Filed Aug. 25, 1958, Ser. No. 756,963

Claims priority, application Great Britain Sept. 5, 1957

4 Claims. (Cl. 62—401)

This invention relates to heat exchangers of the regenerative type. Such heat exchangers or regenerators, as they may be called, comprise a number of chambers filled with heat-absorbing packing through which streams of relatively hot and cold gas are caused to flow in alternate directions. The passage of the hot gas causes heat to be transferred to the packing and this heat is then passed back to the colder gas when the flow is reversed. In general, the flow of gas will be controlled automatically by a system of valves which operate stage by stage to provide the required flow through the chambers of the regenerator.

When a regenerator is operating under steady conditions it is necessary that there should be a balance between the heat absorbed and the heat given up to the gas and if this does not follow automatically from the mass and temperature of the gas flowing in the two directions, it may be necessary to provide a compensating arrangement in the form of a subsidiary flow through one or more of the chambers which, during any one stage of operation, is not carrying the main gas flow. This, of course, necessitates a minimum of three chambers for the regenerator of which, during any one stage of operation, one is being heated by the passage of relatively warm gas, a second is being cooled by the passage of relatively cool gas and a third is carrying the subsidiary or compensating flow of gas.

Such a form of regenerator is described in U.S. Patent No. 2,760,356 particularly with reference to Figure 4 of of the drawings. In this example there is a smaller mass flow of cool gas than warm gas owing to the fact that a proportion of the warm gas flowing is liquefied before the reverse flow occurs. This lack of balance between the flow of gas in the two directions is compensated by the provision of a subsidiary stream of gas which, as described in the particular example, is provided by re-circulating a proportion of the relatively warm gas after it has been cooled by passage through the regenerator. This proportion of the gas is re-heated as a result of its re-circulation but the overall result is to establish a substantial balance between the heat absorbed by the chambers of the regenerator and that transferred to the gas flowing.

Similar compensating arrangements may also be required under other circumstances, for example, if part of the gas flowing has to be tapped off for purposes other than liquefaction or if the total quantity of gas is caused to flow in both directions but there is a variation in its specific heat. In each case, however, it is found that the subsidiary flow provided for compensating purposes functions to cool the packing of the regenerator chamber and to warm the gas flowing.

In the construction shown in U.S. Patent Number 2,760,356 the openings at the lower ends of the regenerator chambers are controlled by means of a rotary valve member, while to avoid the complication of a similar member operating in synchronism with the first at the upper ends of the chambers, these are provided with automatic valves controlled by the gas pressure at the various points. The gas forming the subsidiary stream, which is re-circulated for purposes of compensation, is shown as flowing downwardly through the chamber A5 and has its rate of flow controlled by the valve shown as $V_m$. The pressure drop existing between the points B and C by virtue of the inclusion of the restriction $R_1$ causes the gas to flow upwardly through the valve V15 and then downwardly through the chamber A5 back to the point C.

The valve V15 (and also, of course, the corresponding valves associated with the other chambers which in turn assume the function of V15) is a piston valve which is normally kept closed against the effect of gravity by the high pressure in the manifold 4. Consequently, each valve is only opened when the pressure in the corresponding chamber approaches that of the manifold 4. The opening operation occurs when the valve occupies the position V14 and is caused by gas flowing into the chamber A4 and which gradually builds up the pressure in that chamber until it approaches that in the manifold 4. At this point the effect of gravity is to move the piston downwardly to open the valve. This back pressure required for opening the valve is derived by the gas flow shown as $b_2'$ which is tapped off from the flow $b_1'$ and after passing through the flow regulator 11, enters the chamber A4 by way of the port P4. Consequently when each chamber in turn is in the A4 position it is idle and the only operation which occurs is the build up of pressure, as just mentioned, necessary for opening the valve V14 so that when it takes over the function of the valve V15 the compensating stream of gas may flow downwardly through the chamber A5.

In order to achieve full compensation, the setting of the valve $V_m$ which controls the subsidiary flow is critical and it is inevitable that over long periods of operation there will be a slight drift. In other words, the heat absorbed by the packing of the regenerator chambers will differ slightly from that given up to the gas so that there will be a gradual change of temperature and the temperature gradient which exists along the length of each chamber will be modified. Since in any given set of operating conditions there is an optimum state of the temperature gradient, the slow drift which is produced will lead to loss of efficiency.

It is with this problem that the present invention is concerned, namely the control of the flow of gas in a regenerator arranged for a subsidiary or compensating flow of gas and in which one end of each regenerator chamber is controlled by means of a distributor valve, while the other end is controlled by means of a pressure-controlled valve. As previously mentioned, the heat exchanger must have at least three chambers and the distributor valve, in conjunction with the pressure-controlled valve, must operate in such a way that during each stage of operation one chamber has its packing warmed by extraction of heat from gas from a high pressure source at a relatively high pressure and temperature, a second chamber has its packing cooled by means of a smaller quantity of heat absorbed by gas from a low pressure source at a relatively low pressure and low temperature, while a third chamber has its packing cooled by recirculation of gas which has passed through the first chamber. The control requires to be such that the heat absorbed by the compensating stream of gas flowing in the third chamber is such that during each stage there is substantial balance in the total quantity of heat extracted from and absorbed by the gas in all the chambers.

According to the present invention such a heat exchanger includes means whereby, at the beginning of a stage of operation, a proportion of the gas leaving the first chamber may flow through the distributor valve to produce a temporary reverse flow and thus build up pressure in the third chamber at a rate determined by a flow-control valve, with the result that the pressure-controlled valve at the opposite end of the chamber from the distributor valve is opened at a point in the stage of operation depending on the setting of the flow-control valve and the initial mean temperature of the third chamber, after which the gas flowing through the third chamber enters by the pressure-controlled valve and leaves by the distributor valve so as to cool the packing of the chamber. The effect of this is that during the initial part of each stage of operation there is a flow into the third chamber in the opposite direction to that of the subsidiary or compensating stream and this builds up the pressure in the chamber until the pressure-controlled valve opens to admit the compensating stream of high-pressure gas, after which the flow changes direction and continues in the forward direction for the remainder of that stage of operation. As a consequence of this, if the average temperature of the third chamber is slightly above or below that corresponding to balanced conditions, which means that the temperature gradient along it will have departed from its optimum state, the pressure-controlled valve will open either slightly earlier or later than normal so that the proportion of the stage during which the subsidiary gas stream flows through the chamber is adjusted to restore the temperature gradient towards its optimum state. In other words if, for example, the average temperature of the chamber is slightly too low, it will take slightly longer for the gas pressure necessary to open the valve to build up and consequently the forward flow of the subsidiary stream will occur for a slightly shorter time. Since the subsidiary stream has a cooling effect on the packing of the chamber the fact that it flows for a shorter time makes the average temperature of the chamber slightly greater than it would otherwise have been and tends to restore it towards a balanced condition. Similarly if the chamber is slightly too warm, the subsidiary flow will occur for a longer proportion of the stage of operation so that at the end of the stage the average temperature will have been brought back towards that corresponding to balance.

In practice the means for producing the temporary reverse flow to the third chamber may comprise a pipe leading from the main line of flow of gas from the first chamber at a point downstream of a resistance to the flow, the pipe including a non-return valve connected in parallel with the flow-control valve. As soon as the temporary reverse flow has finished the subsidiary gas stream flowing in a forward direction through the chamber cools the packing of the chamber and is itself warmed, after which it rejoins the cooler high pressure gas. The temporary reverse flow is drawn from gas cooler than the packing of the chamber so that in the absence of any precautions to the contrary there would be a tendency for it to be warmed up during its passage through the distributor valve. The heat thus absorbed by the gas would subsequently be carried in to the cold parts of the machine during the forward flowing portion of the cycle, thus detracting from the refrigeration efficiency. Preferably therefore the subsidiary flow passes through a small heat exchanger, for example a regenerator, before it rejoins the cooler high pressure gas. The initial reverse flow takes up heat from this heat exchanger and consequently it does not need to take up any further heat during its passage through the rotary valve.

The invention will now be described in more detail by way of example with reference to the accompanying drawing which is a schematic view of a modification of the apparatus shown in U.S. Patent No. 2,760,356. Insofar as the different parts of the two forms of apparatus correspond, they are identified by the same reference numerals. The regenerator comprises basically three chambers as opposed to the five chambers in the previous construction and these are shown as A11, A12 and A13. Compressed air, for example, at a pressure of eight atmospheres and at atmospheric temperature, is admitted to the lower end of the chamber A11 via a rotary valve arrangement indicated generally as 51. This comprises an outer casing 52 formed with outlets 53, 54 and 55 to the lower ends of the chambers A11, A12 and A13. The central valve member 56 rotates within the outer casing 52 and may be either driven by steps of 120° with a dwell in each position, or alternatively, and more simply, it is driven continuously so as to make one revolution in a period of, for example, one minute and twenty seconds.

The compressed air inlet is shown as 60 and is in permanent connection with a recess 61 in the valve member 56. In the position shown the recess 61 is in communication with the outlet 53 but as the valve member 56 rotates in a counter-clockwise direction the recess 61 communicates in turn with the outlets 55 and 54. The hollow interior of the member 56 is provided with an opening 62 which, in the position shown is in register with the outlet 54 and receives cooled low pressure air from the chamber A12 which is then exhausted to atmosphere. In order to avoid explosive release of this air, the opening 62 is preceded in the direction of rotation by a small port 59 which controls the initial rush of air before the opening 62 comes into register with each successive outlet. A further recess 63 in the valve member 56 is in permanent connection with a pipe 64 and in the position shown is in communication with the outlet 55 at the lower end of the chamber A13.

The high pressure air passing through the chamber A11 is cooled during its passage and passes via an automatically-operated valve V24, to a high pressure manifold 4 corresponding to that in the previous construction. At the point B the air flow divides, a fraction $c$, passing downwardly to be liquefied as described in the earlier specification. The remainder of the air stream passes onwardly, as indicated by the reference $d$.

At the point D the flow is straight along the manifold 4 because, as shown, the valve V29 is closed. The reason for this is that at the start of each stage of operation the chamber A13 is under low pressure. In the previous stage of operation the chamber A13 has fulfilled the function of the chamber A12, that is to say has had air at low pressure flowing downwardly through it. Consequently the piston valve V29 has the high pressure of the manifold 4 acting on its underside and only the reduced pressure in the chamber A13 acting on its upper side so that it remains closed and no flow of air occurs.

At the point C the main flow of air continues to the turbine 5 connected to the brake 13 and the air is there cooled by adiabatic expansion. The cold exhaust air from the turbine passes through the pipe 6 to the condenser 7 in which it absorbs heat and then passes via the low pressure manifold down through the chamber A12. The proportion of air $c$, after passing down the pipe 8 and through the valve 9, is liquefied in the condenser 7 from whence it is drawn off by means of the automatic expansion valve 12, the liquid air being delivered to the automatic float trap 13 which discharges at intervals to a suitable receptacle.

While the valve V29 remains closed there is a passage for air downwardly from the point C along the pipe 10. In the modified construction shown in the present drawing this pipe includes a regenerative heat exchanger 70 and also a non-return valve 71 in parallel with an adjustable needle valve 72. The air flowing downwardly through the pipe 10 cannot pass through the valve 71 but a controlled flow is allowed through the valve 72 and thence via the pipe 64 to the lower side of the chamber A13. This reverse flow of air starts to build up the pressure in the chamber A13 so that the pressure on the top of the valve V29 starts to increase towards that in the high pressure manifold 4. When the pressure in the chamber A13 has risen sufficiently the valve V29 starts to open. This allows air to flow from the point D through the annular metering orifice formed by the clearance between the piston 32 and the cylinder 33 in which it is free to move. As the pressure in the chamber A13 continues to rise the valve opens progressively until the pressure drop across the orifice falls below that generated across the resistance $R_1$ which takes the form of a spring-loaded plunger valve. At this stage the flow through the chamber A13 reverses and air flows upwardly through the valve V29, downwardly through the chamber, through the valve 71 and thence via the heat exchanger 70 back to the point C. Thereafter for the remainder of the stage of the operation this downward flow corresponds to the downward flow through the chamber A5 in the previous construction.

The downward flow of air through the chamber A13 is controlled by the difference in the pressure drops across $R_1$ and V29 and also by the resistance of the circuit as a whole including that of the chamber A13. Since the flow through the valve 71 is unimpeded there is no adjustment of the flow of air other than that which is given by the original design of the equipment. In a particular example the valve V29 is designed to start opening when the pressure difference across it reaches 15 pounds per square inch. The valve then opens progressively until the pressure across the orifice falls to 3 pounds per square inch at which pressure the valve is fully open. This is the pressure required to lift the weight of the piston 32. The final pressure across the orifice under equilibrium conditions is 2 pounds per square inch.

Although the apparatus is, of course, designed so that the flow of air when the valve V29 is opened is approximately the correct amount, this value is not critical since the modified apparatus is self-balancing. The reason for this is that if the average temperature in the chamber A13 is lower than its equilibrium value, it will take longer before the valve V29 opens because, cold air being denser than warm air, a correspondingly longer duration of flow through the valve V29 is required to establish the necessary pressure. In the particular example referred to above, each stage of operation lasts for 13 seconds. In general the backward flow occupies about eight seconds and the forward flow about five seconds. Consequently if the chamber is slightly too cold the time for the forward flow is reduced below five seconds and consequently the chamber is not cooled as much as it otherwise would have been. Similarly if the chamber is somewhat too warm the valve V29 will open early and the forward flow will last for more than five seconds. Consequently the operation is self-balancing which is of considerable importance for efficient operation. Thus in the balanced condition the temperature gradient along the middle portion of each chamber should be uniform. The temperature at the middle of each chamber should have a value which is mid-way between the temperatures at the two ends. This condition demands precise equality between the amount of heat given up and the amount absorbed in each cycle. If equality is not achieved the middle portion of the chamber becomes either too hot or too cold; most of the temperature gradient is shifted either to the cold end or to the warm end and the gradient in either case becomes much steeped. In the first of these alternatives carbon dioxide is carried in and in the second the increased temperature difference between the two air streams at the warm end allows an excess of heat to be carried into the apparatus.

During the forward flow cool air from the point D is cooling the chamber A13 and is itself taking up heat. A proportion of this heat is then transferred to the heat exchanger 70 before it rejoins the cold air stream at the point C. Consequently, during the first portion of each stage of operation during the period of reverse flow, the air from the point C takes up heat during its passage through the heat exchanger and thus does not need to absorb any further heat during its passage through the rotary valve 51 while the pressure is being built up.

The quantity of air flowing through during the period of reverse flow is controlled by the needle valve 72 so that optimum conditions may readily be obtained.

I claim:
1. A regenerative heat exchanger for connection to a source of high pressure gas and to apparatus capable of receiving gas at high pressure and supplying gas at low pressure, the heat exchanger having at least three chambers each filled with heat-absorbing packing and arranged for sequential operation under the control of a distributor valve which communicates with one end of each chamber, the other end being provided with a pressure-controlled valve, and in which, when the heat exchanger is connected so as to provide the necessary gas flow, the distributor valve, in conjunction with the pressure-controlled valves, operates in such a way that during each stage of operation one chamber has its packing warmed by extraction of heat from gas from the high pressure source at a relatively high pressure and temperature, a second chamber has its packing cooled by means of a smaller quantity of heat absorbed by gas from the low pressure source at a relatively low pressure and low temperature while a third chamber has its packing cooled by recirculation of gas which has passed through the first chamber, the heat absorbed by the gas in this chamber being such that during each stage there is substantial balance in the total quantity of heat extracted from and absorbed by the gas in all the chambers, the heat exchanger also including means whereby, at the beginning of a stage of operation, a proportion of the gas leaving the first chamber may flow through the distributor valve to produce a temporary reverse flow and thus build up pressure in the third chamber at a rate determined by a flow-control valve, with the result that the pressure-controlled valve at the opposite end of the third chamber from the distributor valve is opened at a point in the stage of operation depending on the setting of the flow-control valve and the initial mean temperature of the third chamber, after which the gas flowing through the third chamber enters by the pressure-controlled valve and leaves by the distributor valve so as to cool the packing of the chamber.

2. A regenerative heat exchanger according to claim 1 in which each pressure-controlled valve is a piston valve controlled by the pressure in each chamber assisted by gravity and acting in opposition to the pressure of the high pressure gas from the first chamber, the piston and the valve seating being so shaped as to constitute a metering orifice as the valve opens.

3. A regenerative heat exchanger for connection to a source of high pressure gas and to apparatus capable of receiving gas at high pressure and supplying gas at low pressure, the heat exchanger having at least three chambers each filled with heat-absorbing packing and arranged for sequential operation under the control of a distributor valve which communicates with one end of each chamber, the other end being provided with a pressure-controlled valve, and in which, when the heat exchanger is connected so as to provide the necessary gas flow, the distributor valve, in conjunction with the pressure-controlled valves, operates in such a way that during each stage of operation one chamber has its packing warmed by extraction of heat from gas from the high pressure source at a relatively high pressure and temperature, a second chamber has its packing cooled by means of a smaller quantity of heat absorbed by gas from the low pressure source at a relatively low pressure and low temperature while a third chamber has its packing cooled by recirculation of gas which has passed through the first chamber, the heat absorbed by the gas in this chamber being such that during each stage there is substantial balance in the total quantity of heat extracted from and absorbed by the gas in all the chambers, the heat exchanger also including means whereby, at the beginning of a stage of operation, a proportion of the gas leaving the first chamber may flow through the distributor valve to produce a temporary reverse flow and thus build up pressure in the third chamber at a rate determined by a flow-control valve, with the result that the pressure-controlled valve at the opposite end of the third chamber from the distributor valve is opened at a point in the stage of operation depending on the setting of the flow-control valve and the initial mean temperature of the third chamber, after which the gas flowing through the third chamber enters by the pressure-controlled valve and leaves by the distributor valve so as to cool the packing of the chamber, said means for producing the temporary reverse flow to said third chamber comprising a pipe leading from the main line of flow of gas from said first chamber at a point downstream of a resistance to the flow, said pipe including a non-return valve connected in parallel with said flow-control valve.

4. A regenerative heat exchanger for connection to a source of high pressure gas and to apparatus capable of receiving gas at high pressure and supplying gas at low pressure, the heat exchanger having at least three chambers each filled with heat-absorbing packing and arranged for sequential operation under the control of a distributor valve which communicates with one end of each chamber, the other end being provided with a pressure-controlled valve, and in which, when the heat exchanger is connected so as to provide the necessary gas flow, the distributor valve, in conjunction with the pressure-controlled valves, operates in such a way that during each stage of operation one chamber has its packing warmed by extraction of heat from gas from the high pressure source at a relatively high pressure and temperature, a second chamber has its packing cooled by means of a smaller quantity of heat absorbed by gas from the low pressure source at a relatively low pressure and low temperature while a third chamber has its packing cooled by recirculation of gas which has passed through the first chamber, the heat absorbed by the gas in this chamber being such that during each stage there is substantial balance in the total quantity of heat extracted from and absorbed by the gas in all the chambers, the heat exchanger also including means whereby, at the beginning of a stage of operation, a proportion of the gas leaving the first chamber may flow through the distributor valve to produce a temporary reverse flow and thus build up pressure in the third chamber at a rate determined by a flow-control valve, with the result that the pressure-controlled valve at the opposite end of the third chamber from the distributor valve is opened at a point in the stage of operation depending on the setting of the flow-control valve and the initial mean temperature of the third chamber, after which the gas flowing through the third chamber enters by the pressure-controlled valve and leaves by the distributor valve so as to cool the packing of the chamber, said means for producing the temporary reverse flow to said third chamber comprising a pipe leading from the main line of flow of gas from said first chamber at a point downstream of a resistance to the flow, said pipe including a non-return valve connected in parallel with said flow-control valve, said means for producing the temporary reverse flow including a small heat exchanger.

References Cited in the file of this patent

UNITED STATES PATENTS

| | | |
|---|---|---|
| 1,653,629 | Kerckhoff | Dec. 27, 1927 |
| 2,619,813 | Schuftan | Dec. 2, 1952 |
| 2,626,510 | Schilling | Jan. 27, 1953 |
| 2,677,252 | Rice | May 4, 1954 |
| 2,715,820 | Becker | Aug. 23, 1955 |
| 2,724,954 | Maetz | Nov. 29, 1955 |